United States Patent [19]

Olsen et al.

[11] Patent Number: 5,722,460
[45] Date of Patent: Mar. 3, 1998

[54] DIGITAL SERVO VALVE SYSTEM

[75] Inventors: Zenny Olsen, Farmington; Eric J. Hamman; Gary F. D'Angelo, both of Bristol, all of Conn.

[73] Assignee: Olsen Controls, Inc., Bristol, Conn.

[21] Appl. No.: 728,472

[22] Filed: Oct. 10, 1996

[51] Int. Cl.$^6$ ............................................. F15B 13/044
[52] U.S. Cl. ............................ 137/625.65; 251/129.11
[58] Field of Search .................... 137/625.65; 251/129.11

[56] References Cited

U.S. PATENT DOCUMENTS

| | | | |
|---|---|---|---|
| 2,985,566 | 5/1961 | Tsien et al. | 251/368 X |
| 4,507,634 | 3/1985 | Vanderlaan | 310/36 X |
| 4,641,812 | 2/1987 | Vanderlaan et al. | 251/129.11 X |
| 4,645,178 | 2/1987 | Martin et al. | 251/129.11 X |
| 4,673,160 | 6/1987 | Tolley | 251/129.11 X |
| 4,951,549 | 8/1990 | Olsen et al. | 91/459 X |

*Primary Examiner*—Gerald A. Michalsky
*Attorney, Agent, or Firm*—McCormick, Paulding & Huber

[57] ABSTRACT

A novel digital servo valve system for use in controlling a displaceable actuator includes a valve body with ports, a valve spool displaceable within the valve body to regulate fluid flow through the ports, and a motor having a drive shaft which displaces the valve spool. The system is characterized by a null adjustment mechanism which makes a null rotational position of the drive shaft coincide with a null position of the valve spool, at which positions the valve spool cuts off fluid flow through the ports. The null adjustment mechanism provided in accordance with the present invention permits the null positions of the valve spool and stepper motor to be adjusted without having to disassemble the servo valve.

13 Claims, 4 Drawing Sheets

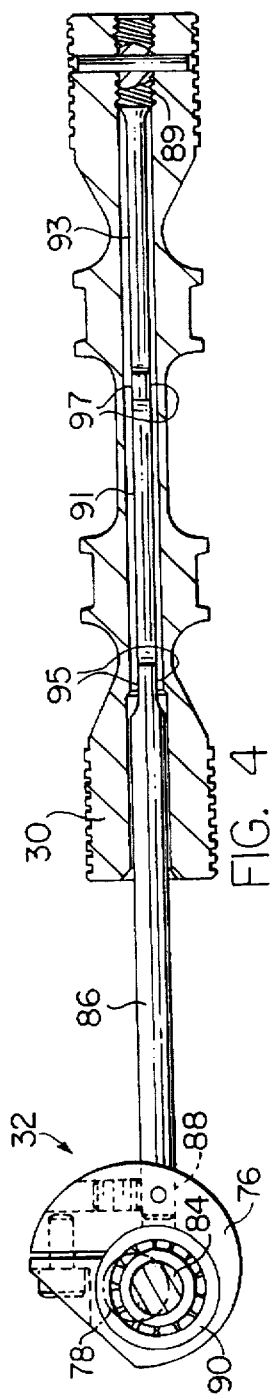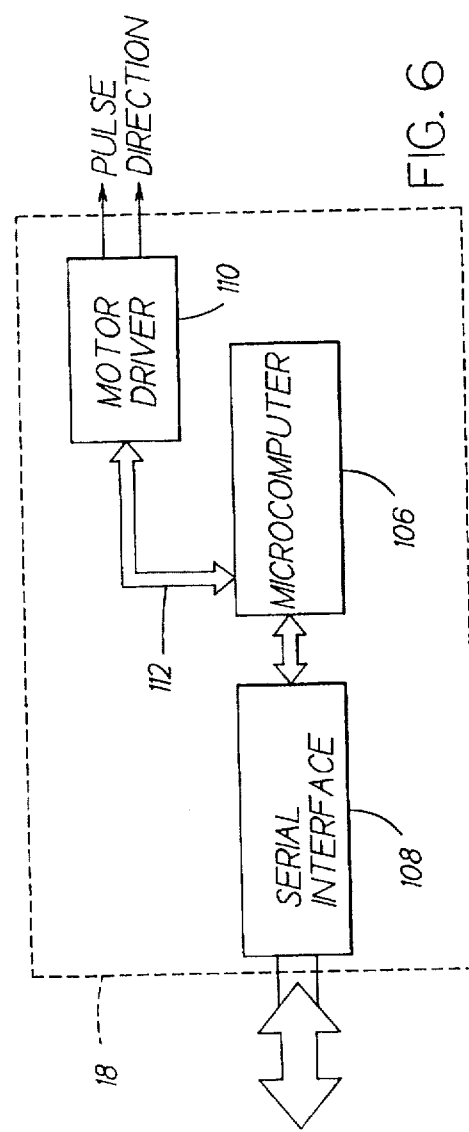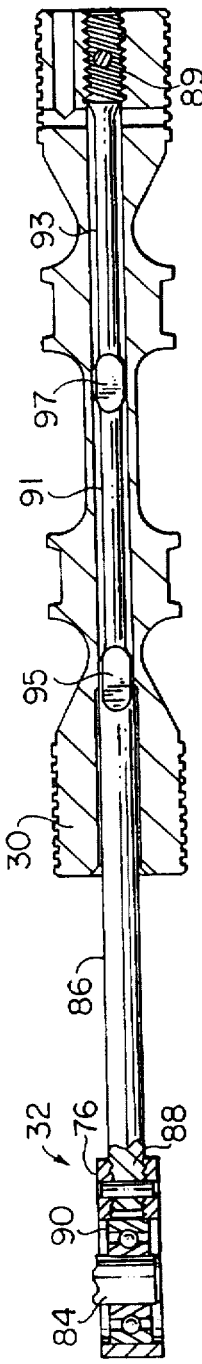

DIGITAL SERVO VALVE SYSTEM

FIELD OF THE INVENTION

The present invention relates to servo valves, and more particularly, to digital servo valves used in systems employing compressible or incompressible fluids.

BACKGROUND OF THE INVENTION

Servo valves are well known in the art. These valves are typically used in hydraulic systems wherein a power supply, such as a pump, applies power to a load by means of a fluid circuit. A servo valve is the interface between the hydraulic system and an electrical, mechanical, fluid or other external type of controller. A single stage servo valve comprises an operating spool whose relative position in a ported valve body controls the rate, pressure and direction of hydraulic fluid flow. Analog servo valves include internal feedback which can be electrical, hydraulic, pneumatic or mechanical in form.

Although analog servo valves are well known in the art, digital servo valve systems are a more recent development. An example of a digital servo valve can be found in U.S. Pat. No. 4,235,156, incorporated herein by reference. Disclosed therein is a single stage, spool type, four-way valve which is controlled by an electric DC stepper motor. The servo valve comprises a valve body with an interior cavity having a plurality of fluid ports. A valve operating member, including a spool, is slidable along a longitudinal axis of the interior cavity. Each of the fluid ports is connected to a respective element in the hydraulic circuit. A source of pressure (pump) communicates with a first port. When the spool is moved along the axis from a center or null position, pressurizing fluid communicates through the valve with the remainder of the hydraulic circuit, as is well known in the art. A digital controller is employed to provide control signals to a digital stepper motor which is connected to the spool of the valve such that rotation of the stepper motor output shaft is translated to linear motion of the spool.

Another example of a digital servo valve system is found in U.S. Pat. No. 4,951,549, also incorporated herein by reference. Disclosed therein is a digital servo valve system which includes a controller for comparing computed values of actuator parameters with preselected parameter values and determining therefrom command signals for the servo valve. A ball screw mechanism eliminates mechanical backlash between the drive motor and the spool.

A drawback of known servo valves lies in adjusting a desired null angular position of the stepper motor shaft to coincide with a desired null position of the valve spool. The stepper motor accepts positional commands and therefrom determines the angular position of the motor shaft. The angular position corresponds to an associated linear position of the valve spool. In order to properly control the motion of the valve spool, a null angular position in the motor shaft must correspond to a desired null position in the valve spool. In known servo valve systems, the null adjustment process is accomplished by the use of a torsion bar which is threaded into the valve spool. The relative length of the torsion bar, and therefore the relative position of the valve spool, is adjusted by disassembling the valve and screwing the bar into or out of the valve spool by the desired amount. The torsion bar is then locked into place with a set screw. Unfortunately, the set screw can vibrate loose and allow the torsion bar to decouple from the valve spool. It is advantageous to have a null adjustment mechanism which allows the torsion bar to be fully pinned against vibrations. It is also advantageous to be able to adjust the null position of the valve and stepper motor without having to disassemble the servo valve.

In known servo valve systems, the spool and sleeve material are preferably made of hardened steel. Steel has a low coefficient of friction and is therefore a preferred material where component surfaces are in continual sliding contact, such as in servo valves. The use of steel also allows the spool edges to be closely cut to the shape of the sleeve. Unfortunately, steel is costly and susceptible to deformation from subsequent heat treatments. It is advantageous to construct the spool sleeve using inexpensive, low friction materials which can also be easily machined.

Still another problem with known digital servo valves is the presence of mechanical backlash which occurs when the stepper motor changes its direction of rotation and displaces the spool in the opposite direction. To accomplish the necessary rotary to linear translation, known servo valve systems employ a grooved helical cam and pin mechanism at one end of the spool. In order to prevent backlash in these systems, a spring apparatus operatively connected to the spool exerts a biasing force against the spool. As a result, the pin is held against one of the sides of the cam groove, regardless of the direction of spool rotation. However, under certain conditions, the force can be overcome, producing the undesirable backlash. It is advantageous to have a servo valve system which was less susceptible to backlash.

SUMMARY OF THE INVENTION

An object of the present invention is to provide a digital servo valve system wherein a desired null angular position of the stepper motor shaft can be adjusted to coincide with a null position of the valve spool.

Another object of the present invention is to provide a digital servo valve system wherein the valve sleeve is comprised of inexpensive, low friction materials which further facilitate easy machining.

Another object of the present invention is to provide a digital servo valve system which does not suffer from a significant amount of mechanical backlash when the shaft of the motor changes direction.

According to the present invention, a digital servo valve system includes a valve body, valve spool, a drive motor, rotary-to-linear translation mechanism, controller and null adjustment mechanism.

The valve body has an interior longitudinal cavity with a plurality of ports spaced there along, each of the ports being in fluid communication with either a pressurized fluid source, a fluid pressure return or an actuator. The valve spool has a plurality of substantially cylindrical lands alternately spaced with a plurality of recessed regions. The valve spool is displaceable within the cavity along a longitudinal axis and cooperatively configured with the valve body to regulate fluid flow through the ports in dependence on the valve spool axial position. The drive motor has a shaft, and rotates the shaft to discrete rotational positions in response to position command signals. The rotary-to-linear translation mechanism is coupled to the valve spool for translating the rotational positions of the shaft to corresponding linear positions of the valve spool. The controller is coupled to the drive motor and generates the position command signals which control the rotational position of the motor shaft.

The null adjustment mechanism makes a null rotational position of the shaft coincide with a null position of the valve spool along the longitudinal axis, at which position the valve spool cuts off fluid flow through the valve body. The null adjustment mechanism comprises an index coupled to the shaft for rotation with the shaft, a shaft stop mounted in the valve body and located at a null position, a torsion spring mounted coaxially of the shaft and engaging the index and the shaft stop such that said torsion spring exerts a force which biases the index towards the shaft stop, and a shaft stop adjustment mechanism for adjusting the null position of the shaft stop.

The null adjustment mechanism is advantageously employed in the digital servo valve system since an electrical null and the hydraulic null can be readily brought into coincidence with each other and without disassembly of the entire valve.

BRIEF DESCRIPTION OF THE DRAWINGS

FIG. 4 is a top plan view of the rotary-to-linear translation mechanism and valve spool in the digital servo valve as seen at the section 4—4 of FIG. 3.

FIG. 6 is a detailed schematic illustration of the controller of FIG. 1.

FIG. 7 is a side elevation view of the rotary-to-linear translation mechanism and valve spool in FIG. 4.

DETAILED DESCRIPTION OF PREFERRED EMBODIMENTS

Figure 1:
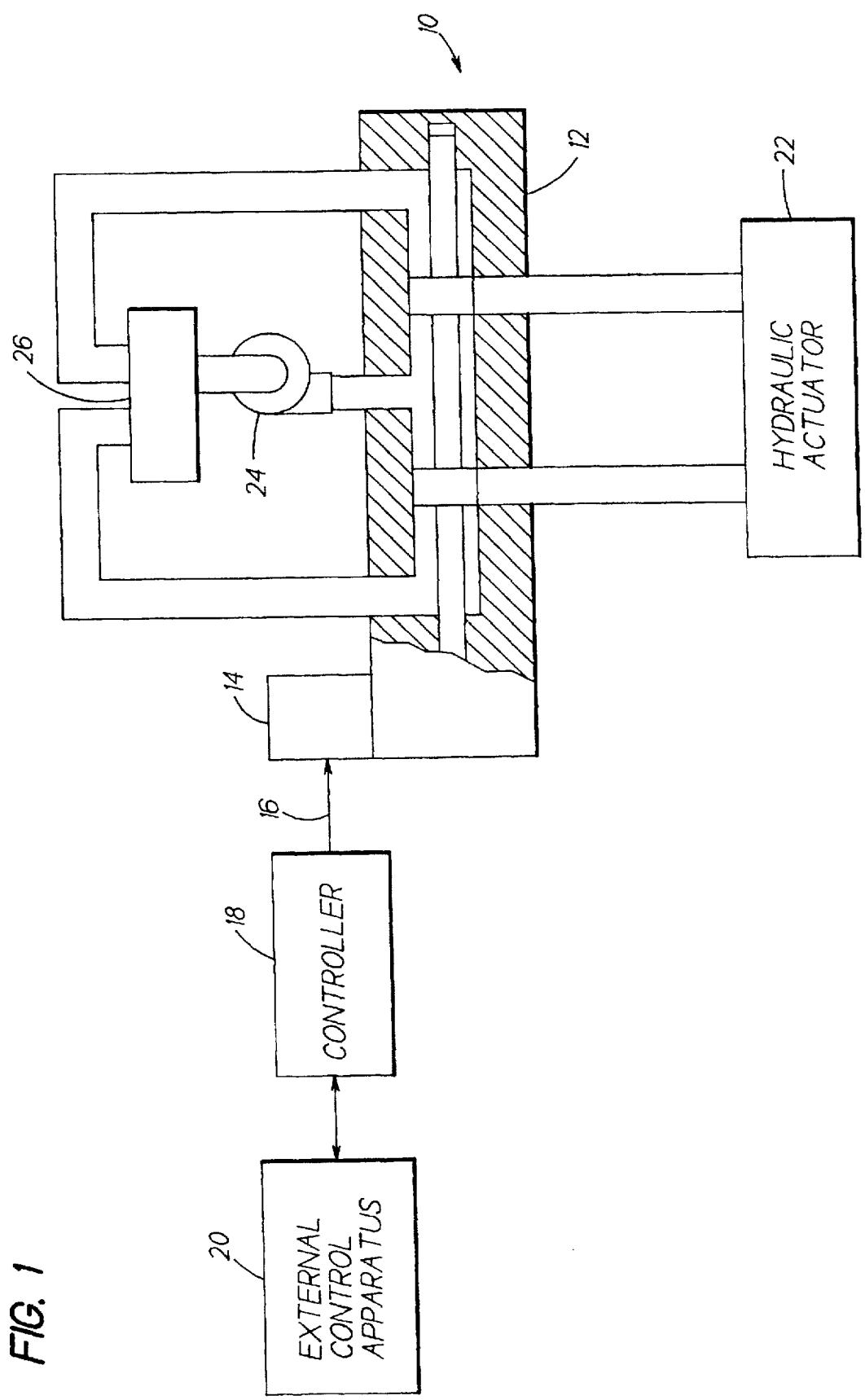
FIG. 1 is a simplified schematic illustration of a digital servo valve system provided according to the present invention.

Referring now to FIG. 1, there is shown in a simplified schematic illustration a digital servo valve system 10. The system includes a digital servo valve 12 which is a single stage, spool type, four-way valve. As detailed hereinafter, the digital servo valve 12 has a ported valve body with a displaceable internal valve spool. The servo valve is actuated by a drive motor 14 which in one form is an electric DC stepper motor. The stepper motor receives position command signals on lines 16 from a controller 18. As detailed hereinafter, the controller receives actuator control signals from an external control apparatus 20 to operate a linear or rotary actuator, such as a hydraulic actuator 22. As is conventional, the servo valve is connected with a hydraulic pump 24, which is a source of high pressure hydraulic fluid, and a reservoir 26 for the return of fluid. The servo valve selectively provides high pressure hydraulic fluid to control the position or output force of the hydraulic actuator 22.

Figure 2:
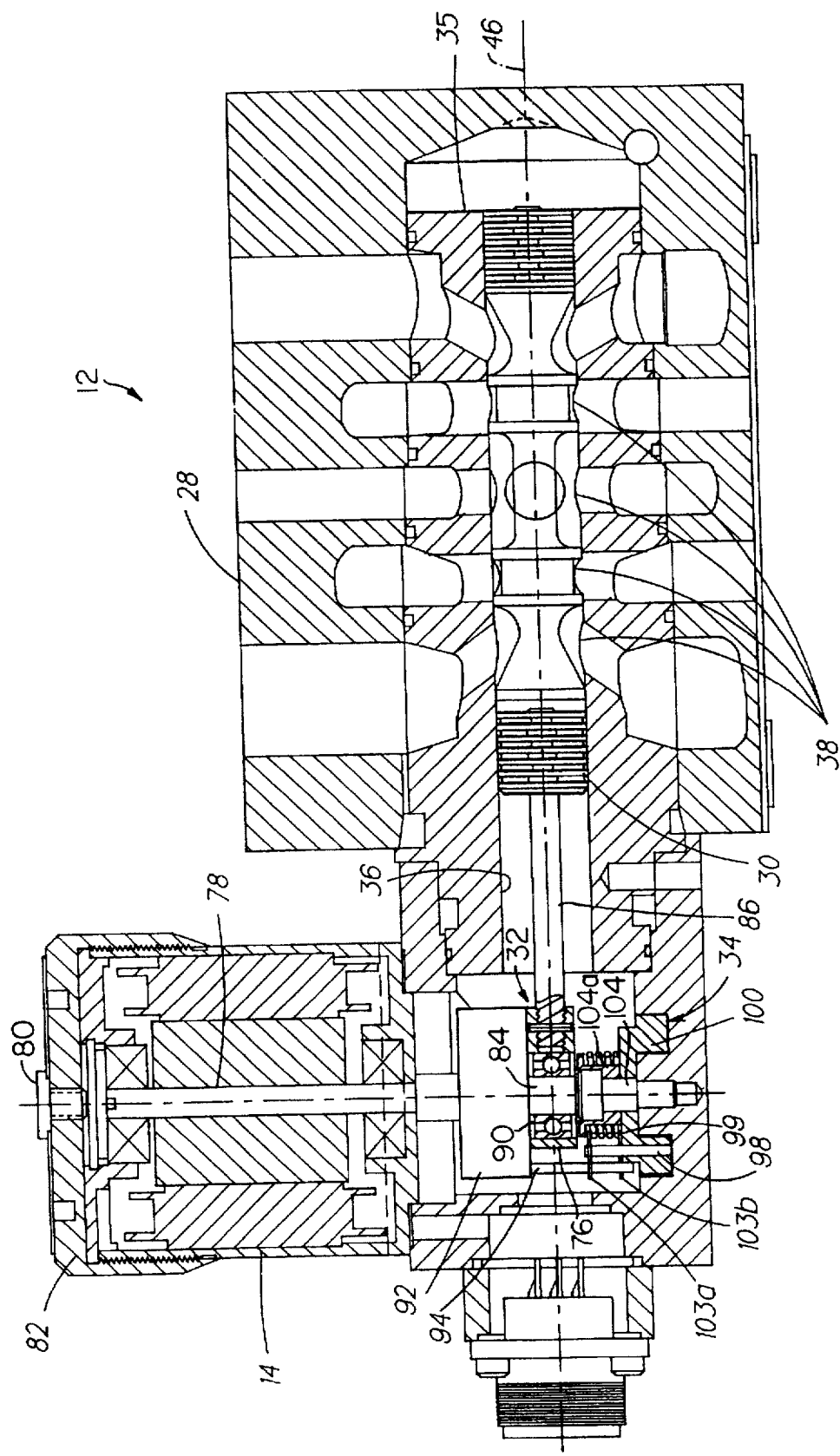
FIG. 2 is a front elevation view of the digital servo valve of FIG. 1, in section

Turning now to FIG. 2, there is shown a simplified schematic illustration of the digital servo valve 12, which includes a valve body 28, a valve spool 30, the digital stepper motor 14, a rotary-to-linear translation mechanism 32 between the motor 14 and the spool 30 and a null adjustment mechanism 34. The valve body 28 includes a stepped cylindrical sleeve 35 having an interior longitudinal cavity 36 with a plurality of ports 38 which communicate with the pump 24, the reservoir 26 and the hydraulic actuator 22 of FIG. 1 through annular chambers surrounding the sleeve 35. Because the external cylindrical surface of the valve sleeve 35 is stepped, the valve sleeve is easily inserted into and removed from the valve body 28.

The valve spool 30 is slidably displaceable within the cavity 36 of the valve body 28 along a longitudinal axis 46 in a conventional manner. The valve spool 30 has a plurality of substantially cylindrical lands alternately spaced with a plurality of recessed regions, which open and close the ports 38 in the valve body to regulate fluid flow through the ports in dependence on the axial position of the valve spool 30.

The valve sleeve 35 which surrounds the valve spool 30 is preferably composed of anodized aluminum, which is easy to machine and has a very hard, cracked surface. The valve sleeve 35 is coated with polytetraflouroethylene (PTFE) which fills the cracks in the surface of the valve sleeve resulting in a surface which has a very low coefficient of friction. The valve sleeve thereby is suitable for use in pneumatic applications without lubrication. The valve spool 30 is composed of steel, rather than anodized aluminum like the valve sleeve because steel can be more precisely cut than anodized aluminum. The lands of the valve spool 30 may then be accurately machined to register precisely with the ports 38 to cause the flow of hydraulic fluid in one direction or the other through the servo valve, or to cut off flow.

The stepper motor 14 has a drive shaft 78 which is rotated to discrete rotational positions in response to position command signals received from the controller 18, as described hereinafter. The drive shaft 78 is coupled to the valve spool 30 by means of the rotary-to-linear translation mechanism 32 so that each rotational position of the shaft corresponds to a discrete position of the spool relative to the valve port 38.

Accordingly, each commanded position of the stepper motor 14 will set a new flow through the ports 38 of the valve body 28. The ability to predict the change in flow for each valve spool position has simplified the modeling of the digital servo valve system 10. With accurate modeling of the digital servo valve system 10, the burden of control is allocated to the controller software 18 which can be adapted to the needs of a particular application.

The stepper motor 14 is fundamentally a DC brushless two-phase motor with a stator and rotor which provides incremental rotary motion through the output shaft 78 in response to currents from an external source. This type of motor has an inherent magnetic detenting action and, in a digital servo valve, provides a stable valve spool position without the need for a feedback transducer, or as in the case of analog servo valve, any mechanical feedback provisions. Electrically a typical stepper motor may be run in one of three modes, full step (200 positions per revolution, 1.8° between positions), half step 400 positions per revolution, 0.9° between positions) and microstep (fractional increments of full step).

As a digital device, a stepper motor has the obvious advantage of being easily interfaced to any microcomputer based system. Other reasons to employ a stepper motor are that it provides an inherently digital output with high resolution, magnetic detents which are precise and repeatable, variable velocity, and acceleration ranges which are greater and more economically feasible than with analog actuators and the capability of accomplishing all of these functions without an inner control loop.

The controller 18 can directly select the level and polarity of the current in the rotor and stator windings of the stepper motor. If the controller maintains a constant current level while switching command signal polarity, the motor advances in a full or half step in each cycle. When the currents in the motor windings are controlled relative to one another, the controller can use the stepper motor to make fractional or "micro" steps. While microstepping, the motor winding currents have a rough sine and cosine relationship that is adjusted in a conventional manner to compensate for the harmonic distortion of the stepper motor torque versus position curve.

Typically, hi-polar chopper drive circuitry is configured as two conventional "H" bridge circuits that allow the current to be reversed in each winding. The current flowing in each winding is sensed and chopped to maintain a command current level, thus rotating the motor output shaft in one or more microsteps. Although the current level of an undivided single winding may drop to zero, the opposite winding will still produce enough torque to maintain an average output of at least seventy percent of maximum output torque. In the preferred embodiment, the stepper motor is configured to provide a maximum of 128 microsteps per full step, yielding 25,600 positions per revolution with 0.14° between positions. For most applications, a 32 microstep resolution will provide adjustments of the servo valve in increments of 0.06 percent of full flow. The small angular difference between consecutive positions of the output shaft while microstepping allows the stepper motor shaft to quickly move from one position to the next position.

FIG. 6 illustrates in simplified, schematic form the controller 18 of FIG. 1. The controller 18 generates the position command signals to control the digital stepper motor 14, as described previously. The controller is configured with pre-engineered software modules specific to the requirements of an application. The controller then provides for either open or closed loop control of the velocity, position or force of the actuator 22. The controller 18 may be used in a stand-alone mode or as a direct interface to a host computer or other external control apparatus.

The controller 18 includes a microcomputer 106 which is typically based on a type 8051 microprocessor. The microcomputer 106 has such conventional computer hardware and software as is necessary to perform the functions described herein. The microcomputer 106 receives command signals from the external control apparatus at serial interface 108, which is preferably a type RS232 or RS485 interface.

A motor driver 110 receives pulse and direction signals from the microcomputer 106 on line 112 The motor driver 110 is conventional and serves as an interface between the microcomputer 106 and the stepper motor 14. In response to the received signals, the driver 110 generates the corresponding position command signals for the stepper motor 14.

The stepper motor 14 is susceptible to contaminants in its operating environment, such as fluids admitted during wash down events or airborne particles. A sealing plug 80 affixed to an exposed end cap 82 of the stepper motor 14 protects the stepper motor 14 from exposure to these contaminants.

The rotary-to-linear translation mechanism 32 converts the rotational position of the motor shaft 78 to a linear position of the valve spool 30. Since the axis of rotation of the shaft 78 is perpendicular to the longitudinal axis 46 of the valve spool 30, the rotary-to-linear mechanism in a preferred form includes a crank, cam or eccentric 84 shown in FIGS. 3 and 4. The eccentric 84 rotates with the shaft 78, and as shown in FIGS. 4 and 7 is connected with the valve spool 30 through a flexible torsion bar 86 and a roller bearing 90. The bearing has an inner race pressed onto the periphery of the eccentric so that the bearing follows the eccentric as the drive shaft 78 rotates ±90° or less from a null position of the spool 30. The flexible torsion bar 86 is threaded and pinned at one end 88 to a clamp 76 secured to the outer race of the bearing 90, and is threaded and pinned at its other 89 end to the remote end of the valve spool 30.

The torsion bar 86 extends through a bore within the valve spool 30 and has an outer diameter closely fitting within the bore, except for the reduced, longitudinally spaced portions 91, 93. Furthermore flats 95, 97 are provided on the sides of the bar adjacent each end of the reduced portion 91, and facilitate bending of the bar in the plane(horizontal) of eccentric motion, but minimize bar deflection in the transverse plane(vertical). The unreduced segment of the bar separating the reduced portions 91, 93 also stabilizes the bar in the transverse plane. Accordingly, the torsion bar 86 may bend during normal operation, but does not buckle when subjected to substantial stress.

With a rotary motion of, for example ±45 degrees, the motor shaft 78 and eccentric 84 impart a linear motion to the torsion bar 86 which in turn moves the valve spool 30 into or out of the valve body 28 relative to the null position of the spool. The bearing 90 of the disclosed rotary-to-linear mechanism 32 eliminates backlash in the system when the digital stepper motor 14 reverses its direction of rotation.

Figure 3:
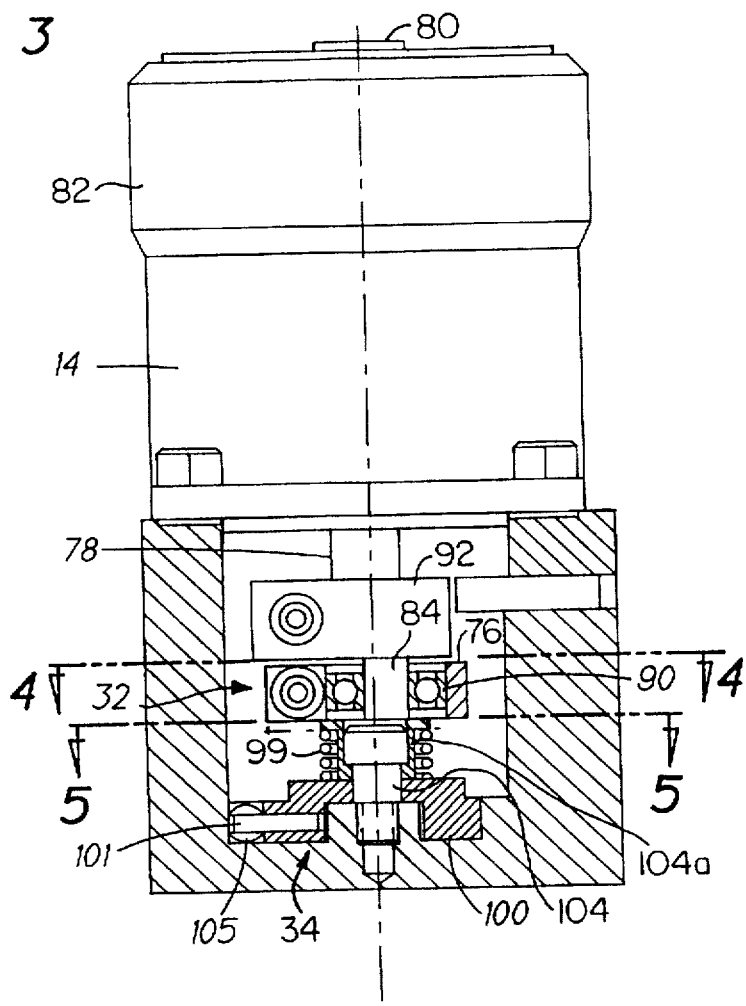
FIG. 3 is a side elevation view of the digital servo valve of FIG. 1.
Figure 5:
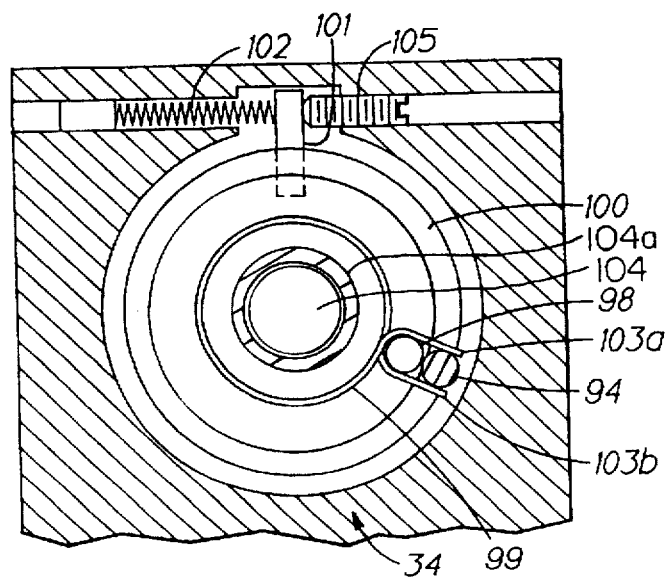
FIG. 5 is a sectional view of the null adjustment mechanism as seen at the section 5—5 of FIG. 3.

The adjustable nulling mechanism 34 shown in FIGS. 2, 3 and 5 returns or restores the motor drive shaft 78 and the valve spool 30 to a null position at which no fluid passes through the servo valve 12 when power is removed from the stepmotor 14. A clamp coupling 92 is positioned on the drive shaft 78, and an index pin 94 is attached to the clamped coupling such that the pin is parallel to the axis of the shaft 78. The index pin is offset from the shaft axis so that the pin moves circumaxially about the shaft 78 upon rotation of the shaft.

A stop pin 98 is affixed to a plate 100 which is secured for rotatation in the base of the valve housing 28 by a retaining screw 104 and a bush 104a. A torsion spring 99 circumscribes the bush, and as shown most clearly in FIG. 5, the tangs 103a, 103b of the torsion spring press against opposite sides of the stop pin 98 and index pin 94 with the spring slightly in tension.

Upon rotation of the shaft 78, the index pin 94 moves circumaxially about the axis of the drive shaft 78, and thereby pushes on one of the spring tangs 103a or 103b and further tensions the torsion spring 99. The torsion spring exerts a biasing or restoring force on the index pin 94, and thereby tends to move the index pin toward the stop pin 98. When the stepmotor 14 is de-energized, the restoring force on the index pin 94 rotates the drive shaft 78, and simultaneously moves the valve spool 30 toward a position set by the stop pin 98. Thus the stop pin 98 serves as a shaft stop mechanism. By appropriate positioning of the stop pin 98, the de-energized position of the motor drive shaft 78 and the valve spool 30 can be set to correspond with the hydraulic null position of the spool within the valve body 28.

To properly position the stop pin 98 for the hydraulic null, the pin is rotated with the plate 100 in the base of the valve body 28. For this purpose a pin lever 101 fixed to the plate is captured between an externally accessible set screw 105 and a preloaded spring 102. The set screw 105 and spring 102 permit the plate lever 101 to be moved and adjusted from the exterior of the valve body and thereby rotate the plate 100 and displace the stop pin 98 about the axis of the drive shaft 78. When the position of the pin 98 is properly set it establishes a null position of the drive shaft 78 and the spool corresponding to the hydraulic null of the spool 30 within the valve housing.

Those skilled in the art will note that the null adjustment mechanism 34 described above allows a fully pinned torsion bar to be used instead of an adjustable threaded torsion bar. Prior art null adjustment mechanisms operate by adjusting the degree to which a threaded torsion bar is screwed into a valve spool. The torsion bar must then be locked into place with an adjustable set screw which may vibrate loose under strong vibrations. In the null adjustment mechanism 34 disclosed in accordance with the present invention, there is no need for an adjustable torsion bar 86. So the torsion bar can be pinned at each end against vibration because the null adjustment is accomplished by means of the stop pin 98 and externally accessible set screw 105.

Although the invention has been shown herein with respect to a preferred embodiment, those skilled in the art will note that certain additions, substitutions and deletions can be made without departing from the spirit and scope of the present invention. Specifically, the invention has been described with respect to an embodiment utilizing hydraulic fluid. Those skilled in the art will note that the present invention is easily adapted for use in pneumatic applications with appropriate substitutions of hardware and software. The null adjustment mechanism is also useful with analog drive motors since the nulling function can be carried out in the same fashion. Accordingly, the present invention has been described in several different embodiments by way of illustration rather than limitation.

What is claimed is:

1. A digital servo valve system for controlling a displaceable actuator, comprising:

a valve body having an interior longitudinal cavity with a plurality of ports spaced there along, said ports being in fluid communication with a pressurized fluid source, a fluid pressure return and said actuator;

a valve spool displaceable within said cavity along a longitudinal axis, said valve spool having a plurality of substantially cylindrical lands alternately spaced with a plurality of recessed regions, said valve spool cooperatively configured with said valve body to regulate fluid flow through said ports in dependence on said valve spool axial position;

motor means having a drive shaft, said motor means establishing rotational positions of said shaft in response to position command signals;

rotary-to-linear translation means within said valve body and coupling said drive shaft and said valve spool for converting rotational positions of said shaft to linear positions of said valve spool;

a controller coupled to said motor means for generating said position command signals; and null adjustment means for establishing a rotational null position of said shaft and a null position of said valve spool within the cavity of the valve body at which null position said valve spool cuts off fluid flow through said valve body, said null adjustment means comprising:

an index coupled to said shaft for rotation with said shaft, shaft stop means mounted in said valve body and located at a null position, a torsion spring mounted coaxially of said shaft and engaging said index and said shaft stop means such that said torsion spring exerts a force urging the index toward said shaft stop means, and shaft stop adjustment means for adjusting the position of said shaft stop means.

2. The system of claim 1 wherein the valve body and the spool together define a four-way servo valve.

3. The system of claim 1 wherein said valve spool is composed of hardened steel and said valve body is composed of anodized aluminum coated with PTFE.

4. The system of claim 1 wherein said drive shaft of the motor means has an axis of rotation which is perpendicular to said longitudinal axis of said valve spool.

5. The system of claim 1 wherein said index comprises an adjustable coupling means affixed to said drive shaft and an index pin affixed to said coupling means.

6. The system of claim 1 wherein said shaft stop means comprises a stop pin affixed to a plate mounted in said valve body, and wherein said shaft stop adjustment means comprises an adjustment lever coupled to said plate, and screw means engaging said lever, thereby rotating said plate and displacing said shaft stop means.

7. The system of claim 1 wherein said rotary-to-linear translation means comprises a crank mechanism coupled to the drive shaft.

8. The system of claim 1 wherein said motor means is a digital stepper motor.

9. The system of claim 1, wherein the rotary-to-linear translation means includes a flexible torsion bar extending into a bore within said valve spool.

10. The system of claim 9, wherein at least one longitudinal portion of said flexible torsion bar has an outer diameter which is in close fitting relationship with the bore of said valve spool.

11. The system of claim 9, wherein said flexible torsion bar has a reduced portion within the bore of the valve spool for increased flexibility.

12. The system of claim 11, wherein the torsion bar has several longitudinally spaced reduced portions separated by an unreduced portion for stabilization.

13. The system of claim 1, in which the rotary-to-linear translation means includes a rotary crank mechanism connected to the drive shaft and a torsion bar connected between the crank mechanism and the valve spool, and the torsion bar has flats on the bar for increased flexibility in the plane of motion of the rotary crank mechanism.

* * * * *